US008648620B2

(12) United States Patent
Yeh et al.

(10) Patent No.: US 8,648,620 B2
(45) Date of Patent: Feb. 11, 2014

(54) PROGRAMMABLE LOGIC CONTROLLER EMPLOYING SINGLE-CHIP

(75) Inventors: Chi-Hsien Yeh, New Taipei (TW); Zhong Qin, Shenzhen (CN); Yang Wang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 246 days.

(21) Appl. No.: 13/210,560

(22) Filed: Aug. 16, 2011

(65) Prior Publication Data
US 2012/0158157 A1 Jun. 21, 2012

(30) Foreign Application Priority Data
Dec. 21, 2010 (CN) .......................... 2010 1 0598872

(51) Int. Cl.
*H03K 19/173* (2006.01)
*G05B 11/01* (2006.01)

(52) U.S. Cl.
USPC ............................................. 326/38; 700/12

(58) Field of Classification Search
USPC ...................... 326/38; 700/12, 291; 702/60
See application file for complete search history.

(56) References Cited

U.S. PATENT DOCUMENTS 8,321,163 B2 * 11/2012 Ewing et al. .................... 702/60
2012/0158156 A1 * 6/2012 Yeh et al. ........................ 700/12
2013/0204450 A1 * 8/2013 Kagan et al. .................. 700/291

* cited by examiner

*Primary Examiner* — Alexander H Taningco
*Assistant Examiner* — Dylan White
(74) *Attorney, Agent, or Firm* — Altis Law Group, Inc.

(57) ABSTRACT

A PLC includes a single-chip, a relay output module, an I/O module, a pulse output module, a relay, and a servo motor. The single chip includes a single-chip timer, a hardware watchdog, a 11.0592M crystal, and an A/D converter module. A system program is burned into an EEPROM of the single-chip. The relay connected to the relay output module. The servo motor is connected to the pulse output module. The system program includes a programming module and a control module. The programming module includes a main function and a function subroutine library, and the main function calls the subroutines of the function subroutine library. The control module scans the input signals from the I/O module during predetermined period, and then generates output signals according to the control commands generated by the programming module, to control output of the relay output module and the pulse output module.

12 Claims, 7 Drawing Sheets

PROGRAMMABLE LOGIC CONTROLLER EMPLOYING SINGLE-CHIP

CROSS-REFERENCE TO RELATED APPLICATIONS

This application claims all benefits accruing under 35 U.S.C. 119 from China Patent Application No. 201010598872.4, filed on Dec. 21, 2010, in the China Intellectual Property Office, the disclosure of which is incorporated herein by reference. This application is related to a co-pending U.S. patent application, which is: application Ser. No. 13/210,558, and entitled "PROGRAMMABLE LOGIC CONTROLLER," by Yeh et al. Such co-pending application has the same assignee as the present application. The disclosure of the above identified application is incorporated herein by reference.

BACKGROUND

1. Technical Field

The present disclosure relates to programmable logic controllers (PLCs).

2. Description of the Related Art

PLCs are widely used in the field of automatic control. The PLC is flexible and convenient for controlling machines, and has been developed for several years. However, PLCs on the market with high reliability and stability are expensive. Using expensive PLCs to control the machines to do simple actions, such as horizontal movement, would increase manufacturing product costs.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
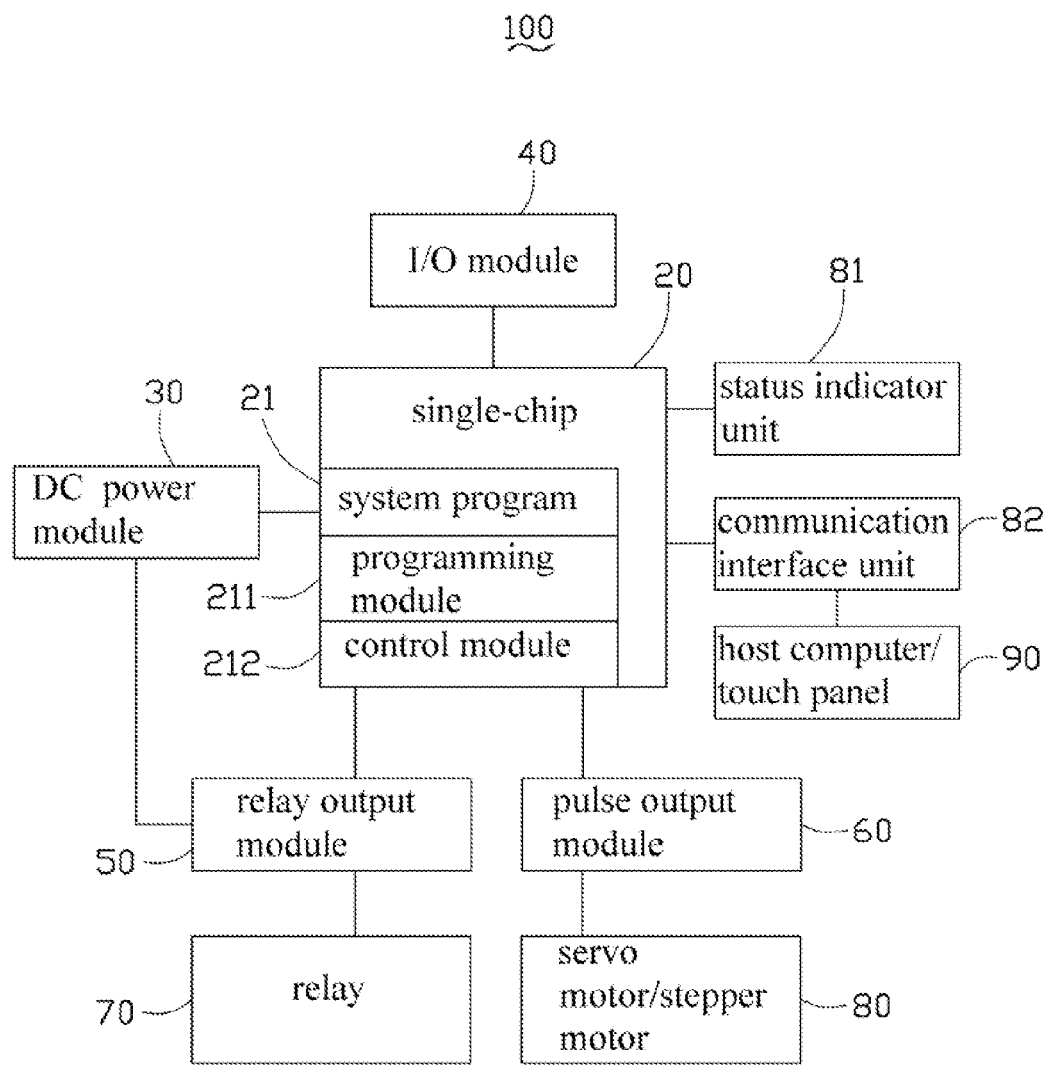
FIG. 1 is a functional block diagram of one embodiment of a PLC including a single-chip, a power module, an I/O module, a relay output module, and a pulse output module.
Figure 2:
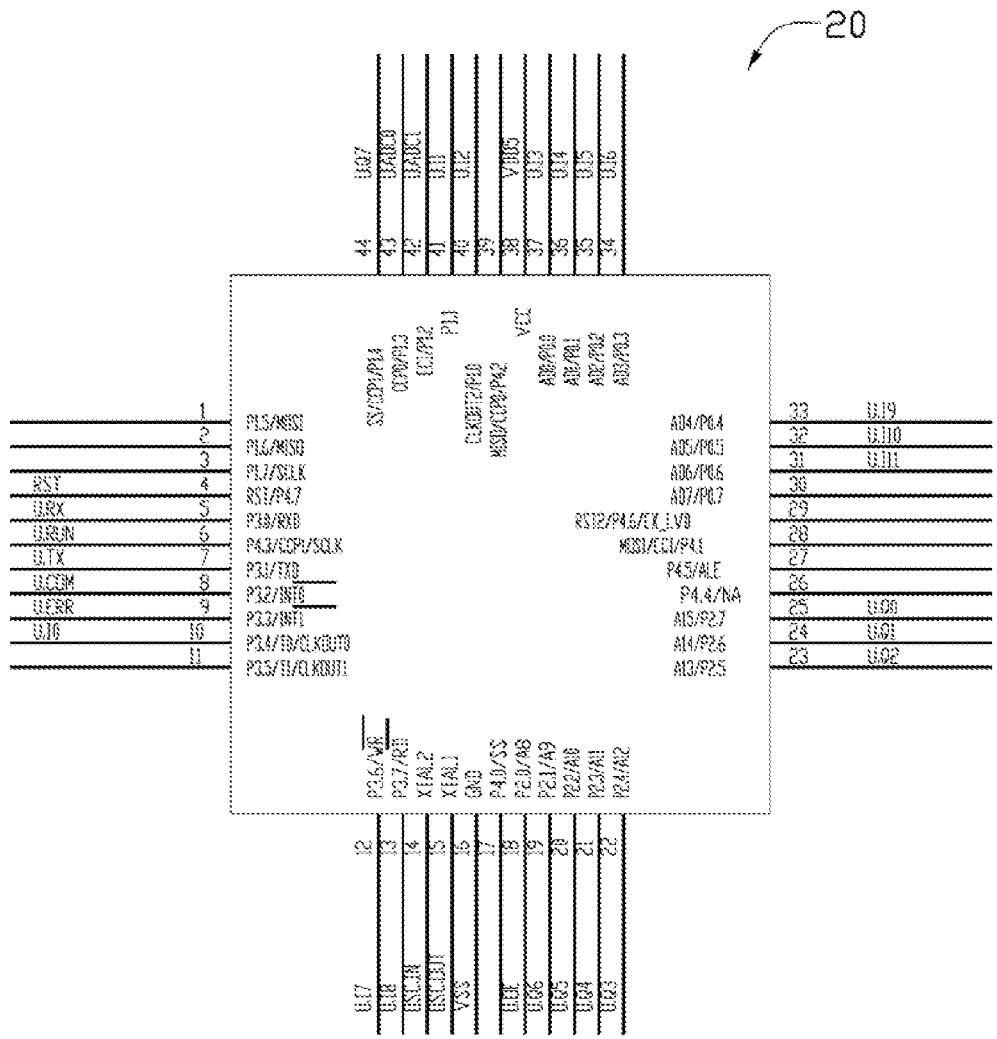
FIG. 2 is a circuit diagram of the PLC of FIG. 1.
Figure 3:
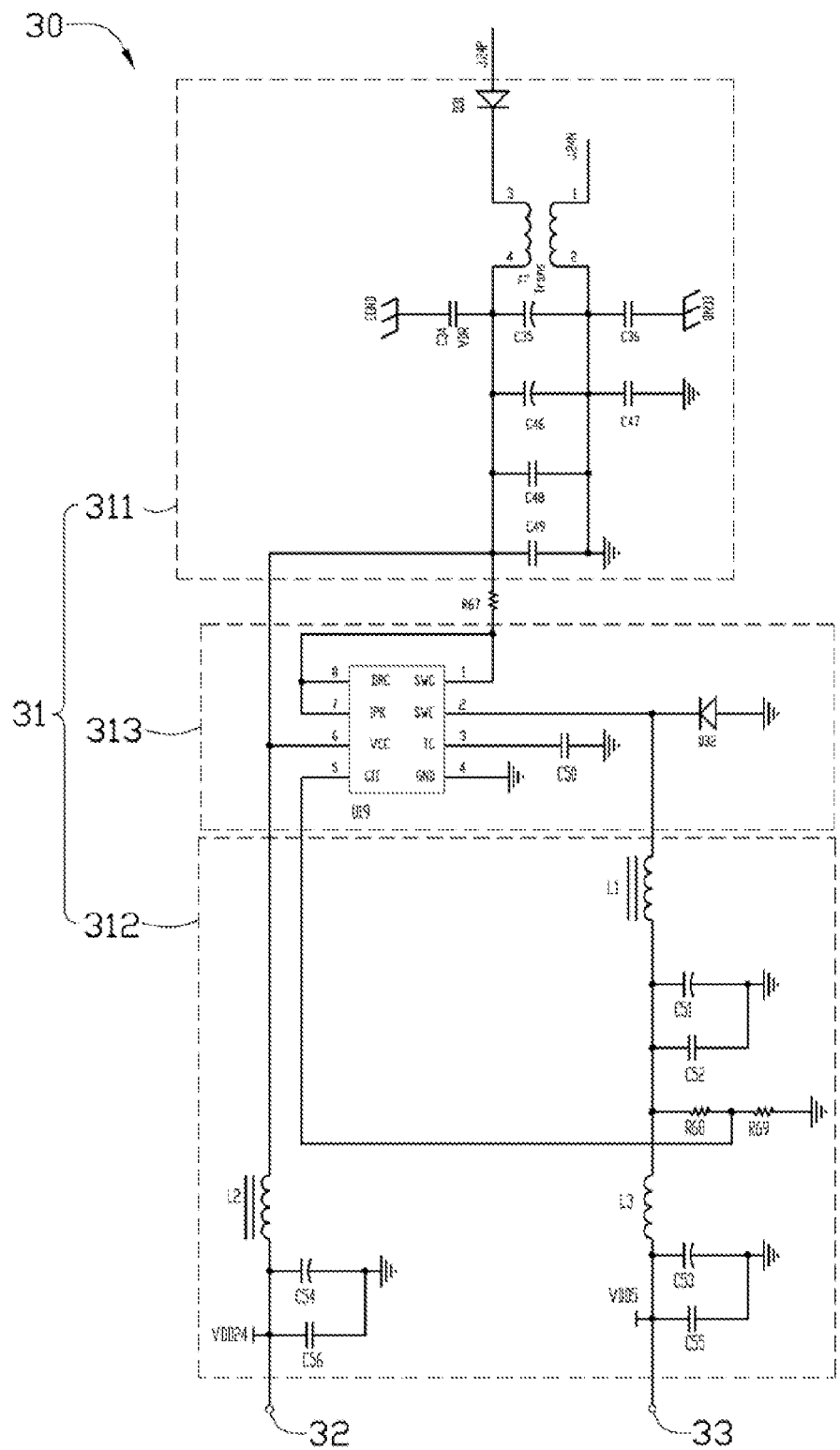
FIG. 3 is a circuit diagram of the power module of FIG. 1.
Figure 4:
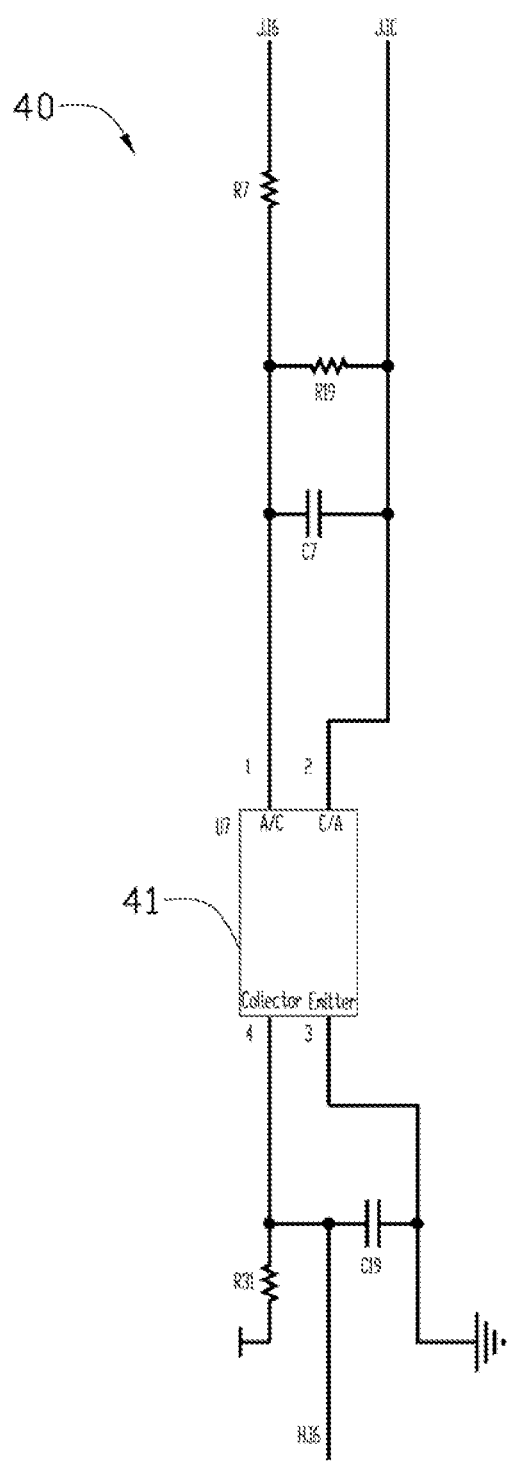
FIG. 4 is a circuit diagram of the I/O module of FIG. 1.
Figure 5:
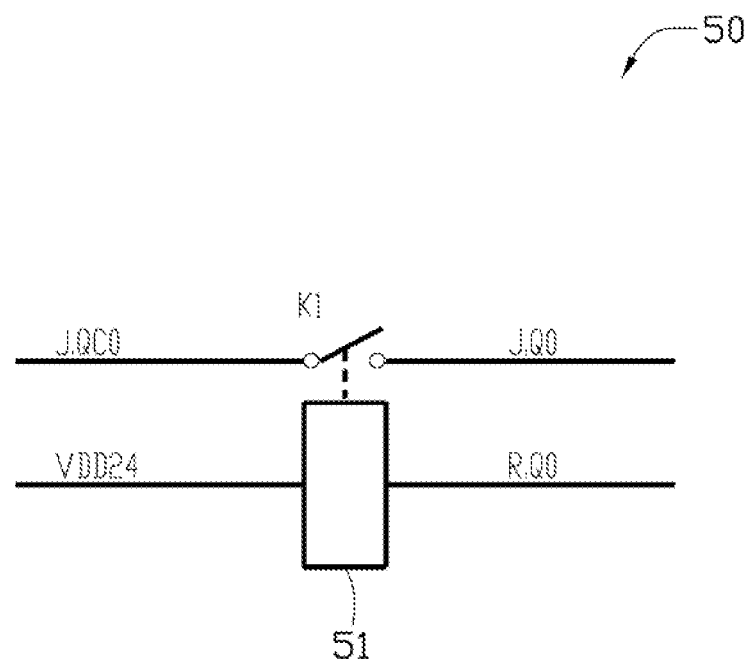
FIG. 5 is a circuit diagram of the relay output module of FIG. 1.
Figure 6:
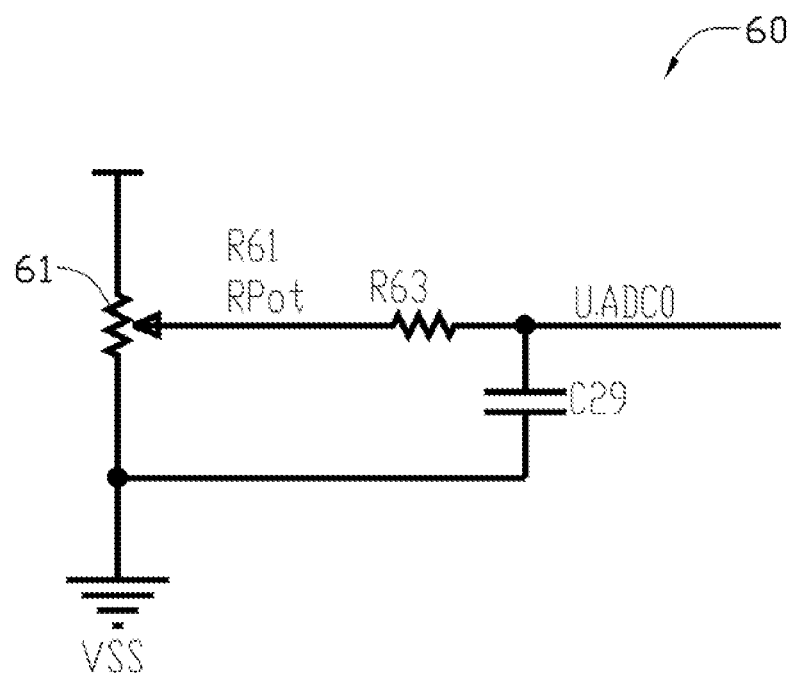
FIG. 6 is a circuit diagram of the pulse output module of FIG. 1.

Referring to FIG. 1, an embodiment of a PLC 100 employs a single-chip 20 as a core, a DC (Direct Current) power module 30, an I/O module 40, a relay output module 50, a pulse output module 60, a relay 70 connected to the relay output module 50, and a servo motor or a stepper motor 80 connected to the pulse output module 60. In one embodiment, the single-chip 20 is an Intel MCS-51® series SOC (System On Chip).

A system program 21 can be burned into an EEPROM (Electrically Erasable Programmable Read-Only Memory) of the single-chip 20. The system program 21 scans input signals from the I/O module 40 during a predetermined period, and generates output signals to control output of the relay output module 50 and the pulse output module 60, thereby controlling the movement of the relay 70 and the servo motor/stepper motor 80.

The Intel MCS-51® series SOC single-chip 20 can integrate a single-chip timer, a hardware watchdog, a 11.0592M crystal, and an A/D converter module. The Intel MCS-51® series SOC single-chip 20 has low cost and can be used easily. Therefore, the PLC 100 using the Intel MCS-51® series SOC single-chip 20 also has a relatively low hardware cost. In the illustrated embodiment, the Intel MCS-51® series SOC single-chip 20 uses 8-bit single machine cycle instruction.

Figure 7:
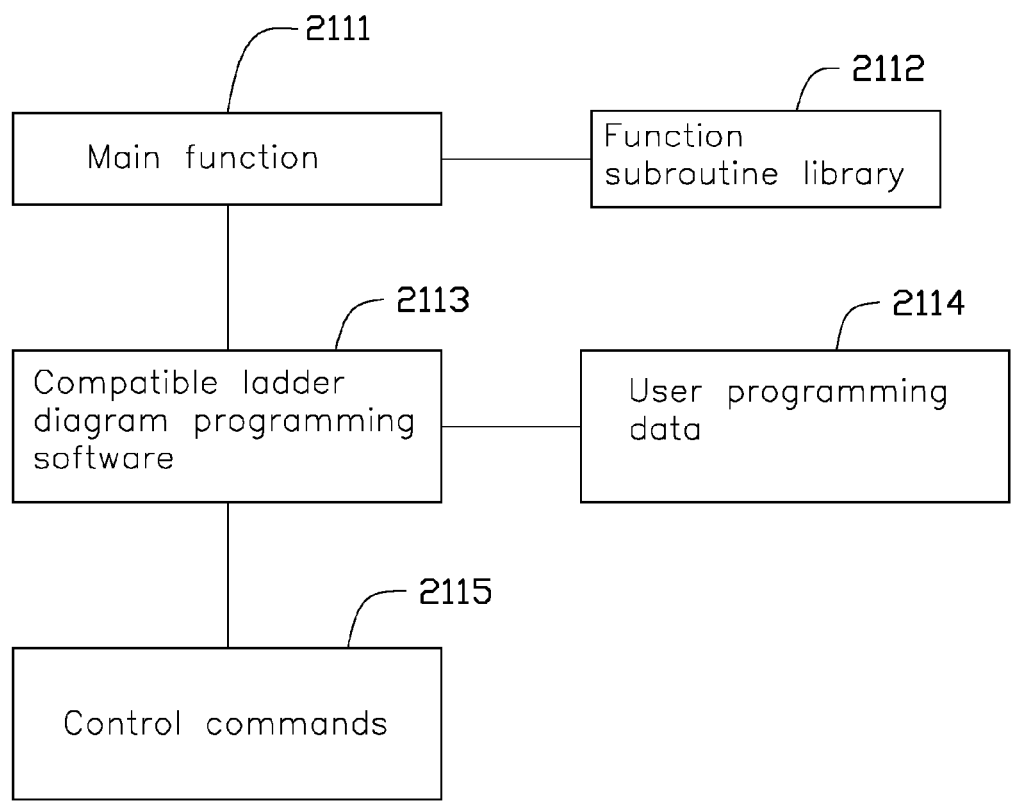
FIG. 7 is a working procedure diagram of a main function employed in the single-chip of FIG. 1.

Also referring to FIG. 7, the system program 21 includes a programming module 211 and a control module 212. The programming module 211 receives user programming data 2114 and generates corresponding control commands 2115. The programming module 211 includes a main function 2111 to compile links, and a function subroutine library 2112 to execute the control commands 2115. The function subroutine library 2112 includes a plurality of subroutines to achieve different functions such as shifting and comparing. The main function 2111 calls the subroutines of the function subroutine library 2112, and the main function 2111 and the function subroutine library 2112 are translated to a ladder diagram by a compatible ladder diagram programming software 2113 to realize simple and convenient programming. The programming module 211 uses a method of the main function 2111 calling the subroutines, and the compatible ladder diagram programming software 2113 to program. Therefore, the PLC 100 is similar with existing brands of PLC, and is convenient for the user to program.

The control module 212 scans the input signals from the I/O module 40 during predetermined periods, processes the input signals according to the control commands generated by the programming module 211, and then generates output signals to control output data of the relay output module 50 and the pulse output module 60.

Referring to FIGS. 2 through 6, the DC power module 30 provides a stable voltage source, and includes an anti-jamming circuit 31, a first output port 32, and a second output port 33. The first output port 32 and the second output port 33 are respectively connected to the anti jamming circuit 31. A 24V DC switching power is connected to an input port of the DC power module 30. The first output port 32 outputs 5V DC power to the Intel MCS-51® series SOC single-chip 20. The second output port 33 outputs 24V DC to the relay output module 50.

To enhance stability of the DC power module 30 and reduce output voltage noise, the anti jamming circuit 31 includes a first filter circuit 311, a second filter circuit 312, and an isolated DC converter module 313 interconnected between the first filter circuit 311 and the second filter circuit 312. In the illustrated embodiment, the first filter circuit 311 and the second filter circuit 312 are multi-level filter circuits, and the isolated DC converter module 313 can be a TI MC34063A® chip, a 1.5-A Boost/Buck/Inverting Switching Regulator. The first output port 32 and the second output port 33 are connected to the second filter circuit 312. The DC power module 30 outputs low current noise, and helps to improve the stability and reliability of the PLC 100.

The I/O module 40 receives and sends digital signals. An optical coupling device is coupled between an input port of the I/O module 40 and an output port of the I/O module 40. In the illustrated embodiment, the optical coupling device 41 may choose a Toshiba TLP280-1® type. The I/O module 40 can have twelve inputs/outputs including a high-speed pulse input, a count input, an analog input interface, and an analog-digital conversion interface.

The relay output module 50 is connected to the relay 70 for controlling the action of a machine (not shown). The relay 51 is connected to the second output port 33 of the DC power module 30. In the illustrated embodiment, the relay output module 50 has eight outputs.

The pulse output module 60 includes an adjustable resistor 61. The output pulse amplitude can be adjusted by adjusting the resistance value of the adjustable resistor 61. The pulse output module 60 drives the servo motor/stepper motor 80 to work. In the illustrated embodiment, the pulse output module 60 has two outputs for controlling the machine to move along two axes.

In addition, the PLC 100 can further include a status indicator unit 81, a communication interface unit 82, and a host computer or a touch screen 90. The status indicator unit 81 is connected to the input/output ports of the Intel MCS-51® series SOC single-chip 20, and has a plurality of LEDs (light-emitting diodes) (not shown). If the status of the input/output ports of the Intel MCS-51® series SOC single-chip 20 changes, the LEDs turn on or off to indicate the status of the input/output ports.

The communication interface unit 82 connects the Intel MCS-51® series SOC single-chip 20 to the host computer/touch screen 90. The communication interface unit 82 can be programmed online by an user, and communicate with the host computer/touch screen 90 through a configuration of the communication routines and a vector map. The communication interface unit 82 can extend the I/O ports.

The PLC 100 employs the Intel MCS-51® series SOC single-chip 20 as the core. Therefore, the PLC 100 has a low hardware cost. Furthermore, the single-chip 20 and the relay output module 50 share the DC power module, thereby simplifying the circuit structure of the PLC 100.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A programmable logic controller (PLC), comprising:
   a single-chip comprising a single-chip timer, a hardware watchdog, a 11.0592M crystal, and an A/D converter module, and having an EEPROM and a system program burned into the EEPROM;
   a relay output module, an I/O module, and a pulse output module respectively connected to the single-chip;
   a relay connected to the relay output module; and
   a servo motor or a stepper motor connected to the pulse output module;
   wherein the system program comprises a programming module and a control module, the programming module comprises a main function, and a function subroutine library; the main function calls the subroutines of the function subroutine library, and the main function and the function subroutine library are translated to a ladder diagram by a compatible ladder diagram programming software, and then control commands are generated according to user programming data; the control module scans the input signals from the I/O module during a predetermined period, and generates output signals according to the control commands generated by the programming module to control output of the relay output module and the pulse output module.

2. The PLC of claim 1, further comprising a DC power module comprising an anti jamming circuit, a first output port, and a second output port, the first output port and the second output port respectively connected to the anti jamming circuit, the first output port is connected to the single-chip, and the second output port is connected to the relay output module.

3. The PLC of claim 2, wherein the anti jamming circuit comprises a first filter circuit, a second filter circuit, and an isolated DC converter module interconnected between the first filter circuit and the second filter circuit.

4. The PLC of claim 3, wherein the first filter circuit and the second filter circuit are multi-level filter circuits.

5. The PLC of claim 3, wherein the isolated DC converter module is a 1.5-A Boost/Buck/Inverting Switching Regulator chip.

6. The PLC of claim 1, wherein the pulse output module comprises an adjustable resistor for adjusting output pulse amplitude.

7. The PLC of claim 1, further comprising a communication interface unit connected to the single-chip, and a host computer or a touch screen connected to the communication interface unit.

8. The PLC of claim 7, wherein the communication interface unit programs online by a user, and communicates with a host computer or touch screen through a configuration of the communication routines and a vector map.

9. The PLC of claim 1, further comprising a status indicator unit connected to the single-chip.

10. The PLC of claim 1, wherein the I/O module comprises an optical coupling device coupled between an input port of the I/O module and an output port of the I/O module.

11. The PLC of claim 1, wherein the I/O module comprises a high-speed pulse input, a count input, an analog input interface, and an analog-digital conversion interface.

12. The PLC of claim 1, wherein the single-chip uses 8-bit single machine cycle instruction.

* * * * *